United States Patent
Park et al.

(10) Patent No.: US 7,720,332 B2
(45) Date of Patent: May 18, 2010

(54) OPTICAL FIBER ILLUMINATOR, METHOD OF FABRICATING OPTICAL FIBER ILLUMINATOR, AND OPTICAL RECORDING HEAD AND OPTICAL RECORDING AND READING APPARATUS HAVING THE OPTICAL FIBER ILLUMINATOR

(75) Inventors: Kang Ho Park, Daejeon (KR); Eun Kyoung Kim, Daejeon (KR); Sung Q Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 12/316,875

(22) Filed: Dec. 17, 2008

(65) Prior Publication Data
US 2009/0142708 A1   Jun. 4, 2009

Related U.S. Application Data

(62) Division of application No. 11/262,255, filed on Oct. 28, 2005, now abandoned.

(30) Foreign Application Priority Data

Dec. 10, 2004  (KR) .............................. 2004-104342
Apr. 26, 2005  (KR) .............................. 2005-34396

(51) Int. Cl.
*G02B 6/32*   (2006.01)
*C03B 37/00*  (2006.01)
(52) U.S. Cl. .............................. 385/33; 385/35; 65/387; 216/26; 264/1.26
(58) Field of Classification Search ............. 385/31–35, 385/49, 135; 264/1.26; 65/387; 216/26
See application file for complete search history.

(56) References Cited

U.S. PATENT DOCUMENTS 3,932,184 A * 1/1976 Cohen et al. ................. 430/321

(Continued)

FOREIGN PATENT DOCUMENTS

JP   59-46616   3/1984

(Continued)

OTHER PUBLICATIONS

"Narrow Pitch Tracking Using Optical Head for Recording with Atomic Force Microscopy" by Kimio Nakamura et al.; *Japanese Journal of Applied Physics*; vol. 37 (1998) Pt. I, No. 4B; pp. 2271-2273.

*Primary Examiner*—Hemang Sanghavi
(74) *Attorney, Agent, or Firm*—Blakely, Sokoloff, Taylor & Zafman LLP (57) ABSTRACT

Provided is an optical fiber illuminator used for recording and reading high density optical information according to a near field recording (NFR) scheme, a method of fabricating the optical fiber illuminator, and an optical recording head and recording apparatus having the optical fiber illuminator. The optical fiber illuminator includes: an optical fiber having a core upon which light is incident and a clad that surrounds the core, one end of the optical fiber having a mirror formed in an inclined manner; and a lens formed on an outer surface of the optical fiber for focusing light reflected by the mirror. The optical fiber illuminator has an improved optical arrangement for optical illumination and detection, it is easy to manufacture, its optical input is easy to control, and it can be readily provided in an array form. When an array type optical recording and reading apparatus having an optical recording head and multiple aperture probes adopts the optical fiber illuminator, the resulting simple arrangement and compact size enables size reduction of the overall apparatus, a signal to noise ratio is high, and high density optical information can be recorded and reproduced at an extremely high rate.

4 Claims, 6 Drawing Sheets

U.S. PATENT DOCUMENTS

| | | | |
|---|---|---|---|
| 4,338,352 A * | 7/1982 | Bear et al. | 427/8 |
| 5,354,985 A | 10/1994 | Quate | |
| 5,517,280 A | 5/1996 | Quate | |
| 5,879,571 A * | 3/1999 | Kalman et al. | 216/26 |
| 6,466,537 B1 | 10/2002 | Kasama et al. | |
| 6,501,878 B2 | 12/2002 | Hughes et al. | 385/35 |
| 6,856,728 B2 | 2/2005 | Zhang | 385/33 |
| 6,904,197 B2 | 6/2005 | Bhagavatula et al. | 385/31 |
| 6,965,714 B2 * | 11/2005 | Brock et al. | 385/33 |
| 2002/0067886 A1 | 6/2002 | Schaub | 385/33 |
| 2002/0114260 A1 | 8/2002 | Kasama et al. | |

FOREIGN PATENT DOCUMENTS

| | | |
|---|---|---|
| JP | 2-267745 | 1/1990 |
| JP | 04308804 A | 10/1992 |
| JP | 8-106646 | 4/1996 |
| JP | 11-248953 | 9/1999 |
| JP | 2002-222550 | 8/2002 |
| JP | 2002-245659 | 8/2002 |
| JP | 2003-172837 | 6/2003 |
| JP | 2003-228856 | 8/2003 |
| KR | 2003-0064140 | 7/2003 |

* cited by examiner

OPTICAL FIBER ILLUMINATOR, METHOD OF FABRICATING OPTICAL FIBER ILLUMINATOR, AND OPTICAL RECORDING HEAD AND OPTICAL RECORDING AND READING APPARATUS HAVING THE OPTICAL FIBER ILLUMINATOR

The present patent application is a Divisional claiming the benefit of application Ser. No. 11/262,255, filed Oct. 28, 2005.

CROSS-REFERENCE TO RELATED APPLICATION

This application claims the priority of Korean Patent Application No. 2004-104342 filed on Dec. 10, 2004 and Korean Patent Application No. 2005-34396 filed on Apr. 26, 2005, the disclosure of which is incorporated herein in its entirety by reference.

BACKGROUND

1. Field of the Invention

The present invention relates to an optical fiber illuminator used for recording and reading high density optical information in a near field recording (NFR) scheme, a method of fabricating the optical fiber illuminator, an optical recording head, and an optical recording head and recording apparatus having the optical fiber illuminator.

2. Discussion of Related Art

In general, optical recording technology that uses focused laser light to record and read information onto/from an optical disk has been the focus of considerable attention as high capacity digital information storage technology.

In conventional technology using a lens optical system, a minimum spot diameter of an optical source is restricted to about half of a wavelength due to a diffraction limit, which limits recording density. Therefore, recently, a near field recording technology using an aperture probe has been widely used to overcome the diffraction limit.

The near field recording technology uses the principle that light passing through a hole (aperture) smaller than a wavelength of laser light propagates in an evanescent wave within a distance similar to the size of the hole. With an aperture probe positioned within a distance of one wavelength of laser light from a recording medium, marks smaller than a wavelength of the laser light can be recorded or read. Therefore, the near field recording device is capable of an extremely high storage density (200 to 400 Gbit/in$^2$) compared to other existing optical recording devices.

Recently, as a near field recording technology using an aperture probe, technologies for recording and reading information at a high speed with the aperture probe formed on a cantilever or a planar slide head have been researched.

U.S. Pat. No. 5,517,280 (May 14, 1996) discloses technology in which a high-speed photolithography process having an optical resolution less than a wavelength is implemented with a number of cantilevers.

A number of cantilevers are caused to vibrate over photoresist, and radiate light through a protruding aperture probe. When the cantilevers vibrate upward and downward, a Van der Waals force is detected through a capacitive plate to control a gap between the aperture probe and the photoresist.

This method exposes photoresist through a number of aperture probes so that multiple nano-scale lithography processes can be performed. However, it is difficult to integrate an optical waveguide into the cantilever through a semiconductor process, and optical transmission efficiency from the optical waveguide into the aperture probe is low, making the method difficult to implement. In addition, the method lacks a specific driving and control technology for manufacturing a large-area scanner.

U.S. Pat. No. 6,466,537 (Oct. 1, 2002) discloses technology in which an aperture is formed on a planar head rather than a probe, and near field light emitted or absorbed from the aperture is measured to read information or control a gap between the head and the media.

The near field light emitted from the aperture is measured to control the gap, so that the gap can be controlled without contacting the probe. A gap between the head and the medium can also be controlled with a flying head used in hard disks. However, with a head arrangement having a signal aperture, this technology is readily adapted to a ROM arrangement for reading a recorded pattern, but it is difficult to adapt to an arrangement for recording information at a high rate.

Korean Patent No. 441,894 (Jul. 16, 2004) discloses a near field optical information recording and reading apparatus using a 1-D array type aperture probe and a micro integrated near field recording head.

Light emitted from an optical fiber comprising an optical illuminator is collected by a micro ball lens, diffracted by a micro mirror, and then incident on the aperture probe. Reflected light is detected with the optical illuminator to read recorded optical information.

However, with the above method, a process of adjusting the micro ball lens and the mirror to collect the incident light on the aperture probe is complicated. In addition, the reflected light is mixed with light scattered around the aperture probe so that it is very difficult to detect only the light reflected from the recording medium. Therefore, a method of reading information through measurement of transmission and so on should be further provided.

As described above, existing technology has many problems concerning an optical arrangement required in optical illumination and detection and a fast and stable optical connection. Consequently, there is an urgent need to improve the existing technology to facilitate its practical use.

SUMMARY OF THE INVENTION

The present invention is directed to an optical illuminator having an improved optical arrangement in which a lens is incorporated with a mirror for better optical illumination and detection than the conventional near field recording (NFR) technology, for use in an aperture probe, and a method of manufacturing the optical illuminator.

The present invention is also directed to an optical recording head, and an optical recording and reading apparatus including an optical fiber illuminator in which a gap between an aperture probe and an optical recording medium can be easily adjusted, and which has a simple arrangement and is easily manufactured.

One aspect of the present invention provides an optical fiber illuminator including: an optical fiber having a core upon which light is incident and a clad that surrounds the core, one end of the optical fiber having a mirror formed in an sloped surface; and a lens formed on an outer surface of the optical fiber for collimating light reflected by the mirror.

Another aspect of the present invention provides a method of manufacturing an optical fiber illuminator, including: a) forming a mirror formed in an sloped surface at one end portion of an optical fiber including a core upon which light is incident and a clad that surrounds the core; b) forming a photoresist on an outer surface of the end portion of the optical fiber; c) exposing a predetermined portion of the photoresist to light incident on the core and reflected by the mirror; and d) forming a lens by removing a non-exposed portion of the photoresist and heating the remaining photoresist.

Still another aspect of the present invention provides an optical recording head having an optical fiber illuminator, the optical recording head including: the optical fiber illuminator described above; a support frame supporting the optical fiber illuminator and having an opening to pass light incident through the lens; an aperture probe for collecting light incident through the opening of the support frame to generate near field light through the opening; and a cantilever having one end portion fixed to the support frame through a spacer, for maintaining a constant gap between the aperture probe and an optical recording medium.

Yet another aspect of the present invention provides an optical recording head having an optical fiber illuminator, the optical recording head including: the optical fiber illuminator described above; a support frame supporting the optical fiber illuminator and having an opening to pass light incident through the lens; an aperture probe for collecting light incident through the opening of the support frame to generate near field light through the opening; a substrate attached to the support frame and accommodating the aperture probe at a portion corresponding to the opening of the support frame; and at least one sliding pad attached below the substrate for maintaining a constant gap between the aperture probe and an optical recording medium.

Still yet another aspect of the present invention provides an optical recording and reading apparatus having an optical fiber illuminator, the optical recording and reading apparatus comprising: a support frame having a plurality of openings to transmit light; a plurality of optical fiber illuminators each having a lens mounted corresponding to a respective one of the plurality of openings; a plurality of aperture probes for collecting light incident through respective openings of the support frame from the plurality of optical fiber illuminators to generate near field light through the openings; a cantilever for maintaining a constant gap between the aperture probes and an optical storage medium; a plurality of light detectors for detecting near field light transmitted through the optical storage medium; and an objective lens located between the plurality of aperture probes and the plurality of light detectors for guiding the near field light to the respective light detectors.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the concept of the invention to those skilled in the art. Like reference numerals refer to like elements throughout the drawings. Various elements and areas in the drawings are schematically shown. Therefore, the present invention is not limited to a relative size or gap shown in the attached drawings.

Figure 1:
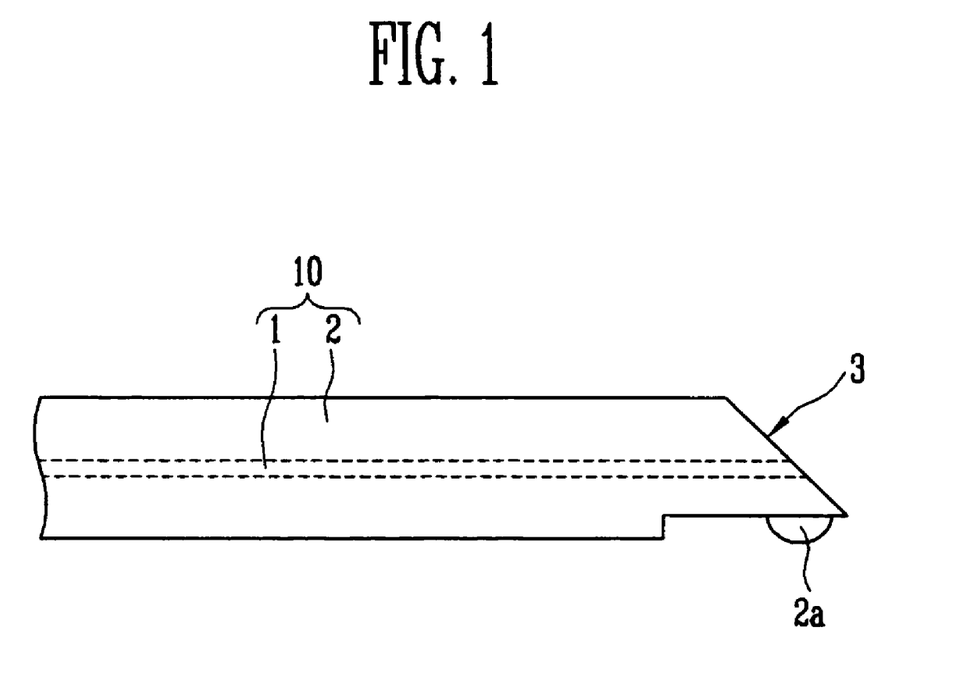
FIG. 1 is a cross-sectional view of an optical fiber illuminator according to an embodiment of the present invention.

FIG. 1 is a cross-sectional view of an optical fiber illuminator according to the present invention, in which a mirror 3 for reflecting light in a horizontal direction and a micro lens 2a for focusing the reflected light are provided in one body.

An optical fiber 10 includes a core 1 upon which light is incident and a clad 2 that surrounds the core 1. A mirror 3 having a 45-degree sloped surface is formed at one end of the optical fiber 10. To form the mirror 3, the sloped surface may be polished or a metal may be coated on the sloped surface such that a total reflection condition is met.

A lens 2a made of a polymer material or the same material as the clad 2 is formed outside the optical fiber 10 to focus light reflected by the mirror 3.

It is desirable that the clad 2 of an end portion of the optical fiber 10 be etched to a predetermined depth to match a surface of the lens 2a with that of the optical fiber 10.

FIGS. 2A to 2F are cross-sectional views for explaining a method of manufacturing an optical fiber illuminator according to an embodiment of the present invention.

Figure 2A:
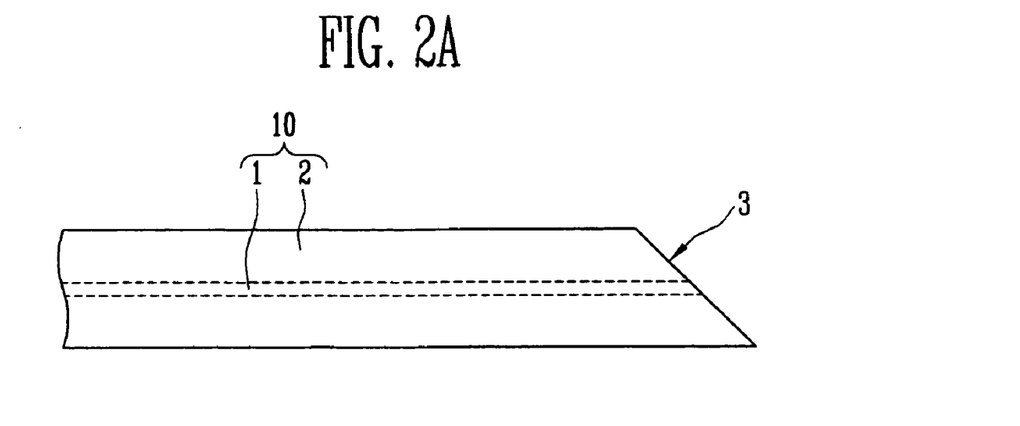
FIGS. 2A to 2F are cross-sectional views for explaining a method of manufacturing an optical fiber illuminator according to an embodiment of the present invention.

Referring to FIG. 2A, the mirror 3 having the sloped surface is formed at one end of the optical fiber 10 that includes the core 1 on which light is incident and the clad 2 surrounding the core 1. The optical fiber 10 is cut such that the sloped surface has an angle of 45 degrees, and the sloped surface is polished or a metal etc. is coated on the sloped surface to form the mirror 3.

Figure 2B:
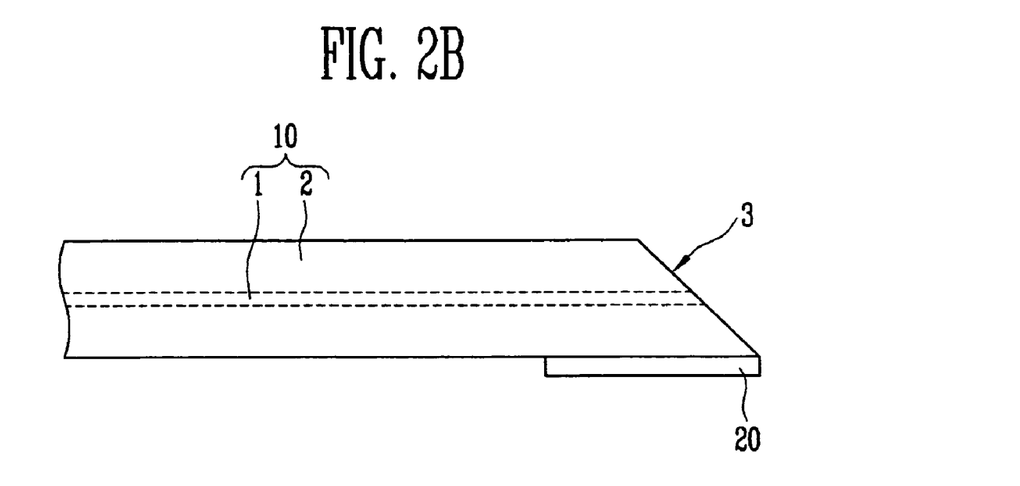

Referring to FIG. 2B, a photoresist 20 is formed on an outer surface of the end portion of the optical fiber 10. The photoresist 20 may be formed through a spin coating or dipping method and a negative photoresist is preferably used.

Figure 2C:
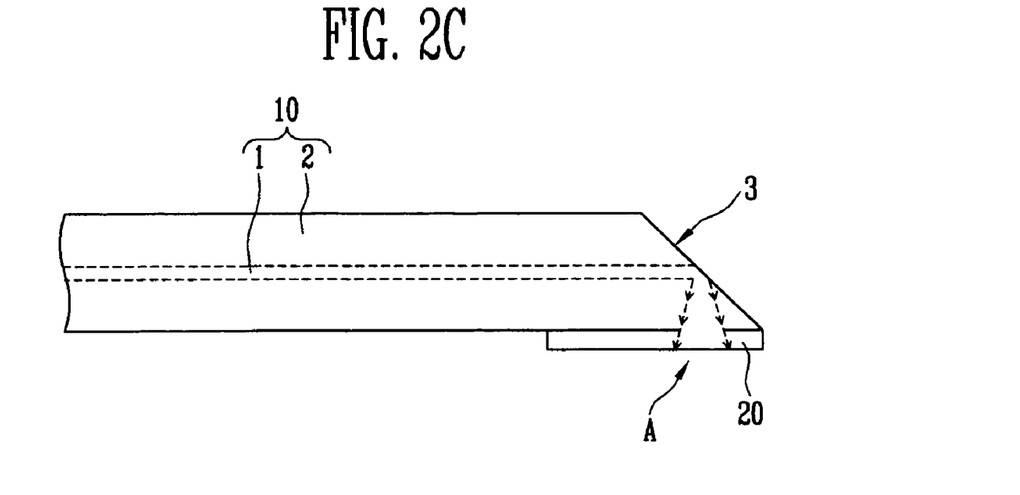

Referring to FIG. 2C, light is incident through the core 1, reflected by the mirror 3, and exposes a predetermined portion of the photoresist 20. When ultraviolet (UV) light is incident through the core 1, the UV light is reflected in a horizontal direction by the mirror 3, and thus the reflected UV light exposes a predetermined portion (A portion) of the photoresist 20. Here, the exposed portion (A portion) of the photoresist 20 is changed into a polymer material that is not removed by a specific etchant.

Figure 2D:
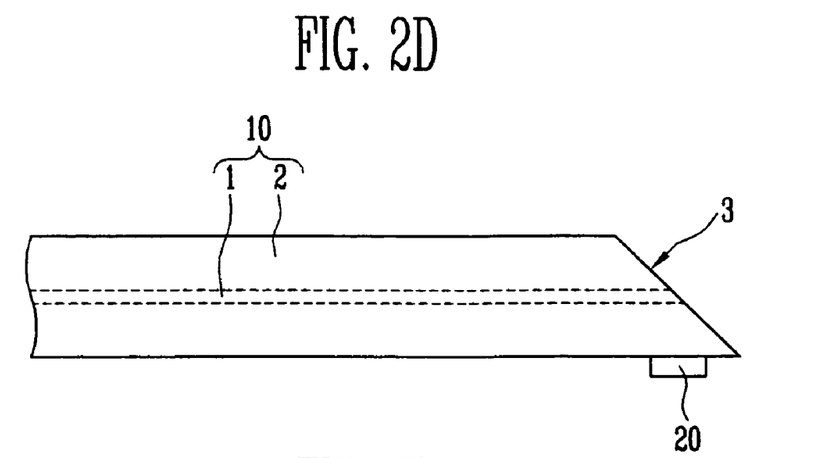

Referring to FIG. 2D, the non-exposed portion of the photoresist 20 is removed. When the photoresist 20 not exposed by the specific etchant is removed, only the photoresist 20 changed into the polymer material remains.

Figure 2E:
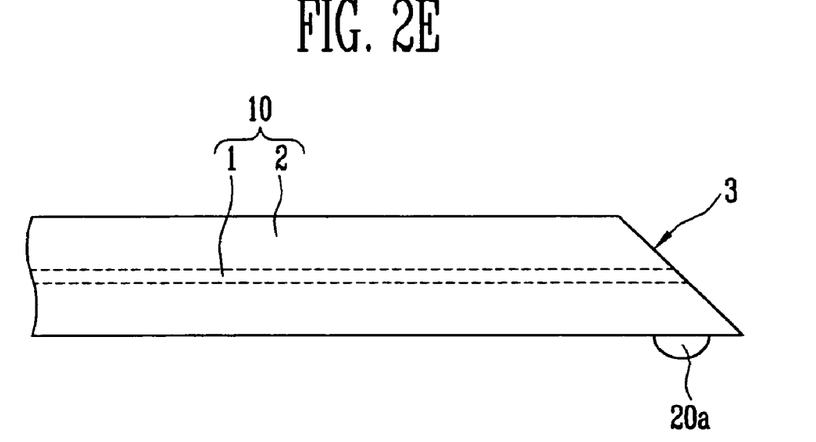

Referring to FIG. 2E, when the remaining photoresist 20 is heated up to its melting point, it is transformed into a lens 20a shape due to surface tension. Here, a variety of lens shapes can be manufactured by controlling heating temperature, time, etc.

Figure 2F:
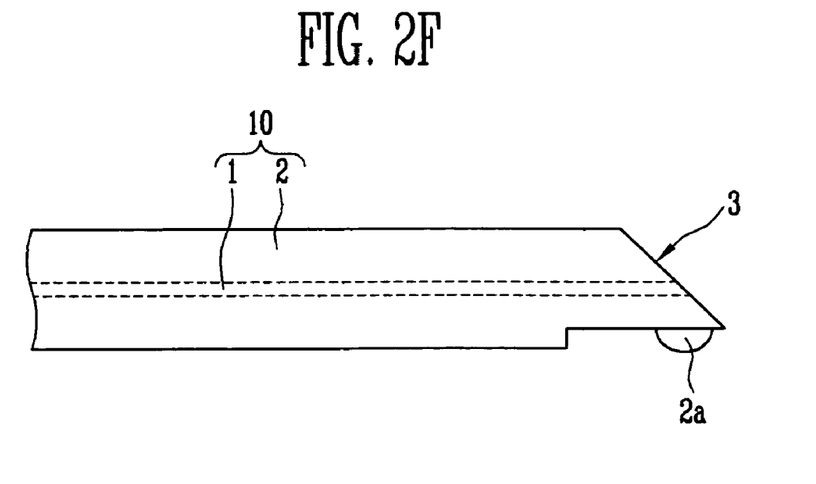

Referring to FIG. 2F, the lens 20a shape and the exposed portion of the clad 2 are etched to a predetermined depth through a dry etching method, so that the lens 2a made of the same material as the clad 2 is formed while matching the surface of the lens 2a with that of the optical fiber 10. Therefore, the lens 2a does not protrude relative to the optical fiber 10, and thus the optical fiber illuminator manufactured as described above can be easily attached to a support frame (30, see FIG. 3). In addition, since the lens 2a is made of the same material (e.g., glass) as the clad 2, a difference in refractive index between the lens 2a and the clad 2 is minimized and optical transmission efficiency can be maximized.

According to another embodiment of the present invention, after the process shown in FIG. 2A, the clad 2 of the end portion of the optical fiber 10 can be etched to a predetermined depth by dry etching etc. Since the clad 2 of the end portion of the optical fiber 10 is etched, the lens 20a does not protrude and matches the surface of the optical fiber 10. Thus, the optical fiber illuminator manufactured as described above can be easily attached to the support frame support frame (30, see FIG. 3). In this case, since the lens 20a is made of the photoresist 20 changed into a polymer material through an annealing process, optical transmission efficiency is reduced relative to the arrangement of FIG. 2F.

Figure 3:
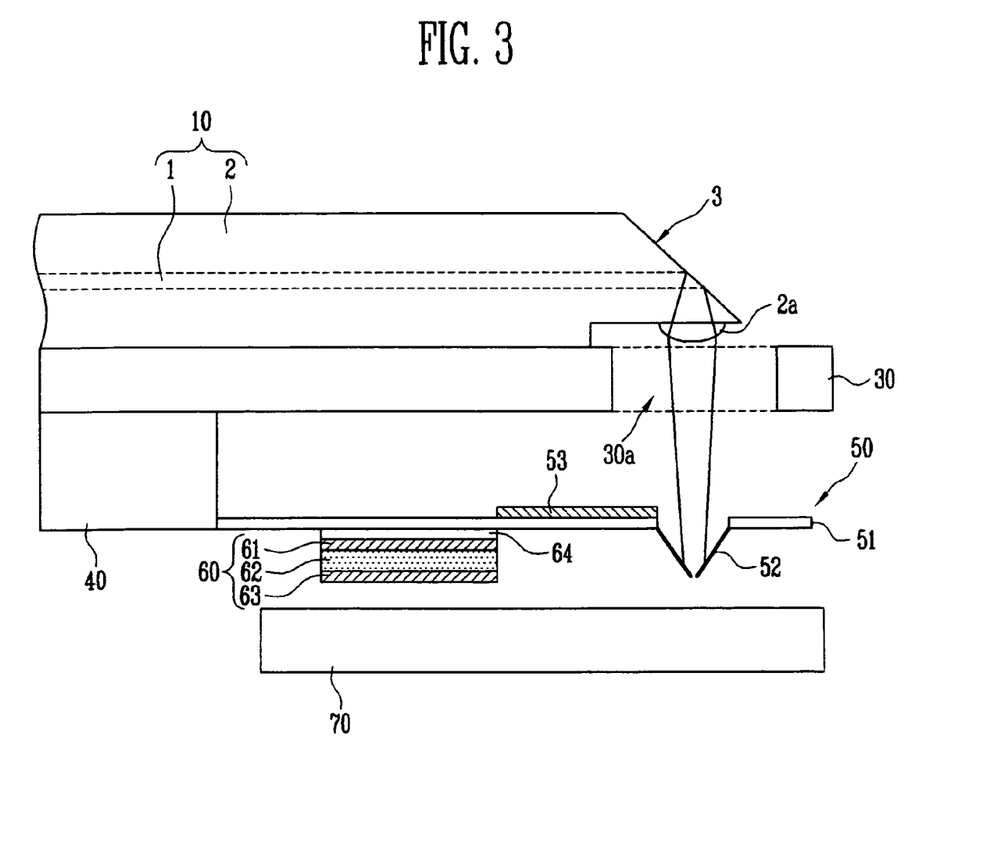
FIG. 3 is a cross-sectional view of an optical recording head having an optical fiber illuminator according to an embodiment of the present invention.

FIG. 3 is a cross-sectional view of an optical recording head having an optical fiber illuminator according to an embodiment of the present invention.

A support frame 30 is coupled to a lower portion of the optical fiber illuminator. A groove (not shown) is preferably formed so that the optical fiber 10 may be mounted on the surface of the support frame 30, and an optical waveguide (not shown) may be formed on the support frame 30. In addition, on the portion of support frame 30 matched to the lens 2a, an opening 30a for passing light incident through the lens 2a is formed.

A cantilever 50 having one end portion fixed to the support frame 30 through a spacer 40 is arranged below the support frame 30, and the cantilever 50 includes an aperture probe 52 for collecting light incident through the opening 30a of the support frame 30 to generate near field light through the aperture. The cantilever 50 maintains a constant gap from the support frame 30 to be as high as the spacer 40, and is movable to maintain a constant gap between the aperture probe 52 and an optical storage medium 70.

The cantilever 50 includes a substrate 51 having one side portion fixed to the support frame 30 through the spacer 40 and including the aperture probe 52 at a portion where the opening 30a of the support frame 30 is matched, a piezoresist 53 formed on the substrate 51 around the aperture probe 52 and having electrical conductivity that varies with a degree of bend in the substrate 51, and a piezo actuator 60 that move the substrate 51 up and down to maintain a constant gap between the aperture probe and the optical storage medium 70 according to electrical conductivity variety of the piezoresist 53. In addition, The piezo actuator 60 is formed below the substrate 51 of the portion of aperture probe 52.

The substrate 51 is made of a thin film such as a silicon-made one, and the aperture probe 52 is manufactured in an arrangement where light can be collected using a semiconductor manufacturing process. The opening formed at the end portion of the aperture probe 52 is preferably smaller than one wavelength, e.g., 50 to 100 nm. When the size of the opening is 50 to 100 nm, near field light having an evanescent waveform and a resolution limit smaller than 100 nm can be obtained.

The piezoresist 53 can be formed with, for example, a boron (B)-doped material, or by doping a surface of the substrate with boron (B), for example.

The piezo actuator 60 is formed in a structure where an electrode 61, a ferroelectric material 62, and an electrode 63 are stacked, and a dielectric layer 64 may be inserted for electric insulation between the piezo actuator 60 and the substrate 51. The ferroelectric material 62 may use PZT.

An operation of an optical recording head having the above-mentioned optical fiber illuminator will now be described.

First, when a predetermined voltage is applied to electrodes 61 and 63 of the piezo actuator 60 after placing the optical recording head on the optical storage medium 70, the cantilever 50 moves up and down according to a piezoelectric principle (contraction or expansion of the ferroelectric material 62). In other words, one end of the cantilever 50 is fixed to the spacer 40 and a Van der Waals force is exerted between the aperture probe 52 and the optical storage medium 70 so that the portion of the cantilever where the aperture probe 52 is formed is bent to maintain a predetermined distance (gap) between the aperture probe 52 and the optical storage medium 70.

When the gap between the aperture probe 52 and the optical storage medium 70 is larger or smaller than a setting value (several tens of nm), the electrical conductivity (electrical resistance) of the piezoresist 53 changes according to a degree of bending of the cantilever 50, and thus the electrical conductivity of the piezoresist 53 is detected. Further, when a voltage applied to the electrodes 61 and 63 of the piezo actuator 60 is controlled according to the detected electrical conductivity, the gap between the aperture probe 52 and the optical storage medium 70 can be maintained at a set value.

When the aperture probe 52 is located at a desired portion of the optical storage medium 70 through the above-described process, light is incident through the core 1 of the optical fiber 10. The incident light is reflected by the mirror 3 and proceeds toward the lens 2a, and light focused by the lens 2a is incident on the aperture probe 52 through the opening 30a. Therefore, from the light focused and input to the aperture probe 52, near field light having an evanescent wave form is generated through the opening of the end portion of the aperture probe 52 and radiated onto the optical storage medium 70. Therefore, optical information can be recorded on and/or read from the optical storage medium 70.

As described above, the optical fiber illuminator of the present invention can be freely mounted on the support frame 30, and the optical fiber illuminator can be easily adjusted to exactly focus the aperture probe 52. In addition, while Korean Patent No. 441,894 (Jul. 17, 2004) discloses that a mirror and a micro lens are respectively manufactured and then assembled, the optical fiber illuminator according to the present invention is manufactured as one body through a simple manufacturing process. Further, the conventional optical recording head detects a degree of bending of the cantilever using a laser and a photodiode, such as in non-contact atomic force microscopy (AFM), and thus the optical recording head has a large size and a complicated arrangement. However, the optical recording head of the present invention can use the piezoresist 53 whose electrical conductivity changes in response to bending of the cantilever 50 so that its arrangement is simple and its size can be significantly reduced relative to the conventional head. In particular, when the substrate 51 is doped with boron (B) etc. to form the piezoresist 53, the size of the optical recording head can be significantly reduced.

Figure 4:
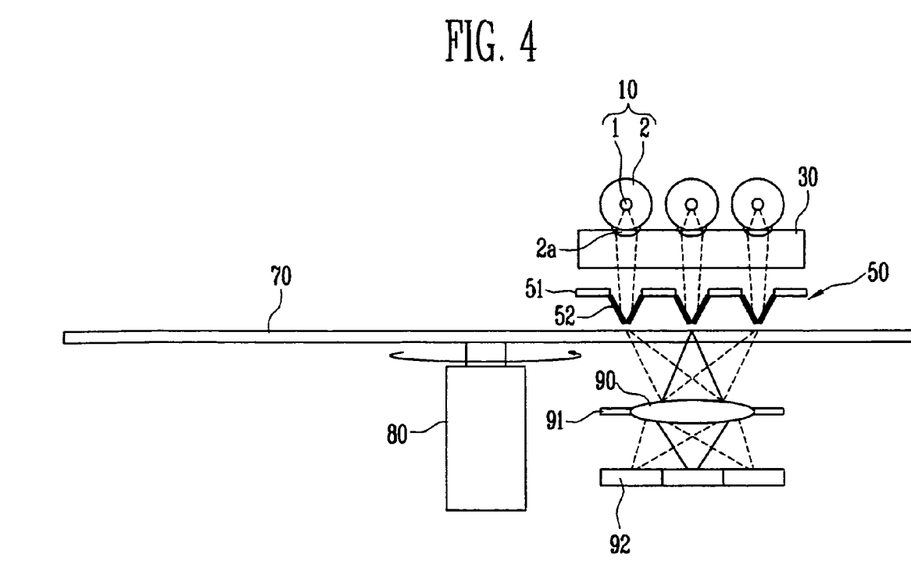
FIG. 4 is a cross-sectional view of an optical recording and reading apparatus having an optical fiber illuminator according to an embodiment of the present invention.
Figure 5:
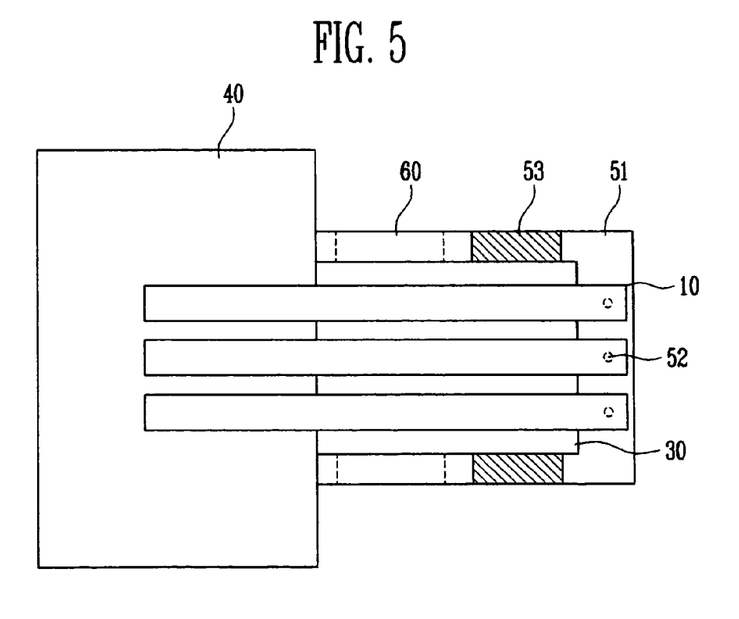
FIG. 5 is a plan view of an optical recording head shown in FIG. 4.

FIG. 4 is a cross-sectional view of an optical recording and reading apparatus having an optical fiber illuminator according to an embodiment of the present invention, and FIG. 5 is a plan view of an optical recording head shown in FIG. 4.

The optical recording head for use in the optical recording and reading apparatus according to the present invention is manufactured to have the same arrangement as shown in FIG. 3. However, in order to record and read several bits of information simultaneously, a plurality of openings 30*a* are formed to pass light to the support frame 30, and a plurality of optical fibers 10 are arranged in an array on the support frame 30 such that lenses respectively match the plurality of openings 30*a*.

In addition, the cantilever 50 having one end portion fixed to the support frame 30 through the spacer 40 is arranged below the support frame 30, and the cantilever 50 has a plurality of aperture probes 52 that respectively collect light incident through the openings 30*a* of the support frame 30 to generate near field light. In other words, the aperture probes 52 correspond to the openings 30*a* of the support frame 30, respectively, and are arranged in an array in the radial direction of the optical storage medium 70.

Although not shown in FIG. 4, the cantilever 50 includes a substrate 51 having one side portion fixed to the support frame 30 through the spacer 40 and including the plurality of aperture probes 52 at a portion where the openings 30*a* of the support frame 30 are matched, a piezoresist 53 formed on the substrate 51 around the aperture probes 52 and having electrical conductivity that varies with a degree of bend in the substrate 51, and a piezo actuator 60 that moves the substrate 51 up and down to maintain a constant gap between the aperture probes and the optical storage medium 70, as shown in FIG. 5. In addition, a coarse driver such as a voice-coil-motor (VCM) for the optical storage medium 70 to track a widely varying wobbling motion may also be used. The VCM driver is well-known technology in the field of optical recording, so it will not be described herein.

The near field light passing through the optical storage medium 70 is detected with a plurality light detectors 92 arranged in an array. Here, each light detector 92 is arranged to correspond to each aperture probe 52, so that the light detector 92 detects the near field light supplied through each aperture probe 52.

In addition, an objective lens 90 is located between the plurality of aperture probes 52 and the plurality of light detectors 92 to guide the near field light to the light detector 92. The objective lens 90 is arranged such that it is movable by a driver 91, and thus the near field light can be adjusted to exactly focus the light detector 92.

An operation of the optical recording and reading apparatus of the present invention arranged as described above will now be explained.

When the disk-type optical storage medium 70 is rotated by a spindle motor 80, the optical recording head hovers over the optical storage medium 70. Here, the plurality of aperture probes 52 are arranged in radial direction of the optical storage medium 70.

First, in order to store optical information on the optical storage medium 70, light is incident through the core 1 of each optical fiber 10 in the array. The incident light is reflected by the mirror 3, incident on and focused by the lens 2*a*, and incident on the aperture probes 52 through the openings 30*a*. Therefore, light is collected at the aperture probes 52 and thus an evanescent wave of near field light is generated through the openings of the end portion of the aperture probe 52. Further, the near field light is radiated onto the optical storage medium 70 so that optical information is recorded on the optical storage medium 70.

Next, in order to read the optical information stored on the optical storage medium 70, light is incident through the core 1 of each optical fiber 10 in the array, reflected by the mirror 3 toward the lens 2*a*, focused by the lens 2*a*, and incident on the aperture probes 52 through the openings 30*a*. Therefore, light is collected at the aperture probes 52, and thus an evanescent wave of near field light is generated through the opening of the end portion of the aperture probe 52 and is radiated onto the optical storage medium 70. Here, the near field light passes through the optical storage medium 70 according to information stored on the optical storage medium 70 and is incident on the corresponding optical detector 92 via the objective lens 90 so that optical information is detected.

The optical recording and reading apparatus of FIG. 4 records and reads several bits of optical information at the same time through a plurality of aperture probes 52, so that an information processing rate can be improved.

Figure 6:
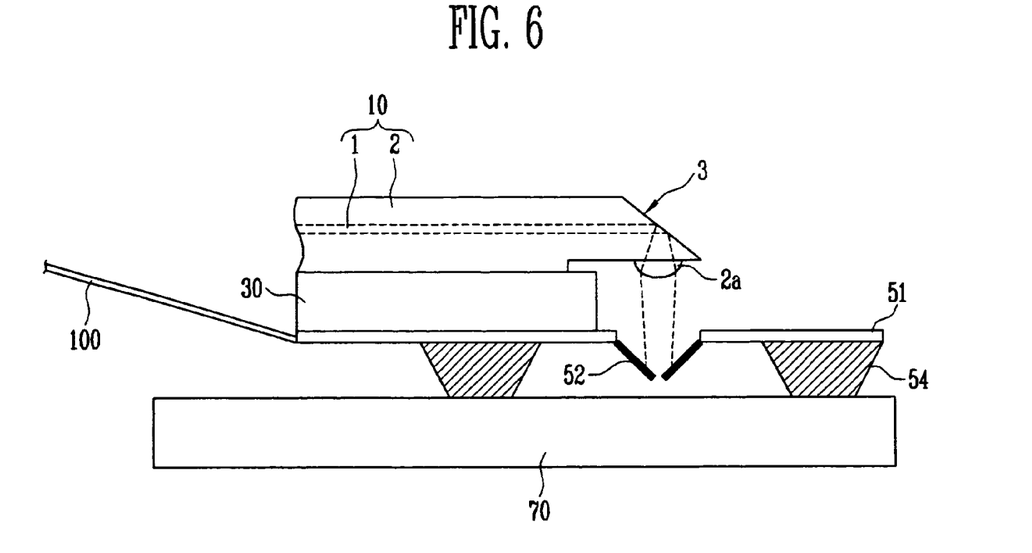
FIG. 6 is a cross-sectional view of an optical recording head according to another embodiment of the present invention.
Figure 7:
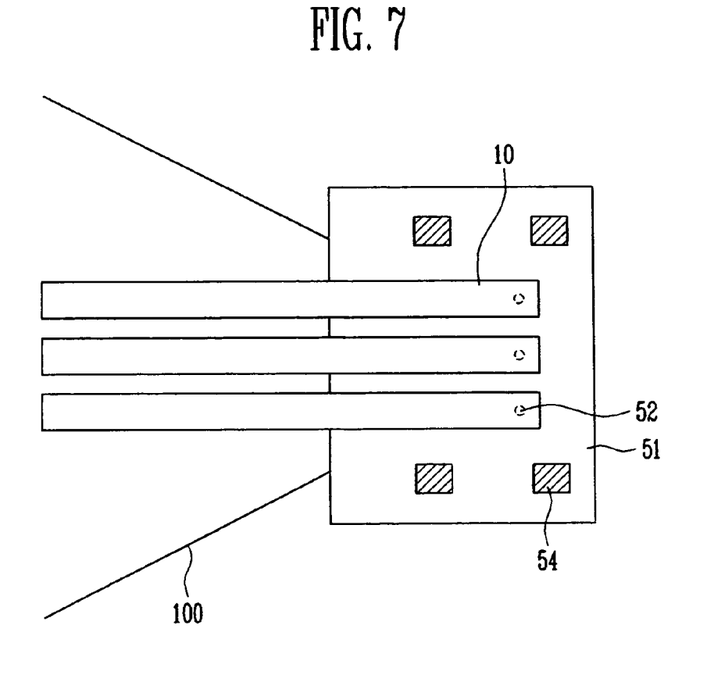
FIG. 7 is a plan view of an optical recording head according to another embodiment of the present invention.

FIGS. 6 and 7 are a cross-sectional view and a plan view of an optical recording head according to another embodiment of the present invention, respectively.

The support frame 30 is coupled to the lower portion of the optical fiber illuminator manufactured as shown in FIG. 2A to 2F. Here, a groove (not shown) is preferably formed such that the optical fiber 10 can be mounted on a surface of the support frame 30, and an optical waveguide (not shown) can be formed on the support frame 30.

The substrate 51 is attached below the support frame 30, and the portion of the substrate 51 matched to the opening 30*a* of the support frame 30 has an aperture probe 52 for collecting light incident through the opening 30*a* to generate the near field light through the opening. In addition, at least one sliding pad 54 is attached below the substrate 51 around the aperture probe 52 to maintain a constant gap between the aperture probe 52 and the optical storage medium 70. Here, it is desirable that the sliding pad 54 contact a surface of the optical storage medium 70. In addition, one side of the substrate 51 is connected to a suspension support frame 100 for closely attaching the sliding pad 54 to the surface of the optical storage medium 70 while damping vibration of the optical recording head such as a typical hard disk head. The suspension support frame 100 is made of a flexible metal.

The substrate 51 is made of a thin film such as a film formed from silicon, and the aperture probe 52 is manufactured in an arrangement where light can be collected using a semiconductor manufacturing process. The opening formed at the end portion of the aperture probe 52 is preferably smaller than one wavelength, e.g., 50 to 100 nm. When the size of the opening is 50 to 100 nm, near field light having an evanescent wave form and a resolution limit smaller than 100 nm can be obtained.

The optical recording head arranged as described above physically maintains a constant gap between the aperture probe 52 and the optical storage medium 70 due to the sliding pad 54, so that the piezoresist 53 and the piezo actuator 60 illustrated in FIG. 3 are not necessary. Therefore, the optical recording head has a simple and highly functional arrangement. And, the aperture probe 52 is advantageously protected from damage by the sliding pad 54.

Further, when the optical recording head according to the above embodiment of the present invention is manufactured in an array as in FIG. 4, it is rather difficult to track an information recording region of the optical storage medium.

Therefore, for normal tracking, not only accurate horizontal driving in the radial direction but also driving control technology for sideways tilting is required. Thus, an actuator for a fine driver and a horizontal driver for tilt control should be manufactured together.

As described above, the present invention provides an optical illuminator having an improved optical arrangement in which a lens is incorporated with a mirror for better optical illumination and detection, and a method of manufacturing the optical illuminator. The optical illuminator of the present invention is easy to manufacture, its optical input is easy to control, and it can be readily provided in an array form.

The optical recording head using the optical fiber illuminator is easy to manufacture and integrate, and has a simple arrangement and a small size.

In addition, when an optical recording and reading apparatus having an array structure including a plurality of aperture probes adopts the inventive optical fiber illuminator and the optical recording head, near field light transmitted through an optical storage medium is detected using the optical detector arranged in an array. Therefore, a signal to noise ratio is greatly improved relative to the conventional arrangement in which light reflected at the aperture probe is measured, and high density optical information can be recorded and read at an extremely high rate. In particular, a rate of 36 MHz required for video implementation can be easily provided.

Although exemplary embodiments of the present invention have been described with reference to the attached drawings, the present invention is not limited to these embodiments, and it should be appreciated by those skilled in the art that a variety of modifications can be made without departing from the spirit and scope of the present invention.

What is claimed is:

1. A method of manufacturing an optical fiber illuminator, comprising:
   a) forming a mirror in a sloped surface at one end portion of an optical fiber including a core upon which light is incident and a clad that surrounds the core;
   b) forming a photoresist on an outer surface of the end portion of the optical fiber;
   c) exposing a predetermined portion of the photoresist to light incident on the core and reflected by the mirror; and
   d) forming a lens by removing a non-exposed portion of the photoresist and heating the remaining photoresist.

2. The method according to claim 1, wherein the sloped surface has an angle of 45 degrees and is polished or coated with a metal to form the mirror.

3. The method according to claim 1, further comprising, after step a), etching the clad of the end portion of the optical fiber to a predetermined depth to match the surface of the lens with the surface of the optical fiber.

4. The method according to claim 1, further comprising, after step d), etching the lens made of the photoresist and the exposed portion of the clad to a predetermined depth such that the lens is formed with the same material as the clad while matching the surfaces of the optical fiber and the lens.

* * * * *